INVENTOR.
HAROLD A. QUIST

Feb. 21, 1961   H. A. QUIST   2,972,252
TEMPERATURE CORRECTED GAUGE
Filed Dec. 5, 1957   3 Sheets-Sheet 2

INVENTOR.
HAROLD A. QUIST
BY Robert O. Spindle
ATTORNEY

Feb. 21, 1961

H. A. QUIST 2,972,252

TEMPERATURE CORRECTED GAUGE

Filed Dec. 5, 1957

INVENTOR.
HAROLD A. QUIST
BY
*Robt O. Spindle*
ATTORNEY

# United States Patent Office 2,972,252
Patented Feb. 21, 1961

2,972,252

TEMPERATURE CORRECTED GAUGE

Harold A. Quist, Swarthmore, Pa., assignor to Sun Oil Company, Philadelphia, Pa., a corporation of New Jersey Filed Dec. 5, 1957, Ser. No. 700,787

3 Claims. (Cl. 73—321)

This invention relates generally to apparatus for gauging the liquid content of storage tanks and particularly to apparatus for determining both the depth and volume of stored liquids corrected for temperature affecting those measurements.

Improvements in float operated indicators are primarily concerned with the accuracy of the combination. Changes in the elements to achieve this accuracy include refinements in the float and float guides, compensation for temperature effects on the cables and containers, and for the temperature effect on the stored liquid, and also refinements in the indicating mechanism. Among the indicating mechanisms known are those showing the indicating media arranged spirally in relation to a rotating drum. Such arrangement permits wider separation of the gauge indicia and resultant closer reading of the indicated volume for greater accuracy. This invention is an improvement on spiral indicators of this description.

Further accuracy has been sought for all types of liquid volume indicators by correcting the instrument reading for the above-mentioned temperature effect on the stored liquid volume. This is particularly true in reading the stored volumes of volatile liquids commonly found in the petroleum and allied industries. Present means for correcting volatile liquid body depths for temperature effects are mathematical, mechanical or electro-mechanical. The primary object of this invention is to provide a volume correction means of a mechanical type for use with spiral indicators wherein a high degree of accuracy in float operated indicators is achieved. Another object is to enable the temperature effect to be determined simultaneously on both the volume and the stored liquid depth in the storage vessel.

Broadly, the invention comprises a liquid supported float cable-connected to a rotatable drum. A helix of desired pitch is cut into the drum surface and operably engages a vertically - balanced, horizontally - movable pointer. Concentrically positioned relative to the axis of the rotatable helically cut drum a rotatable transparent enclosing drum supports indicia showing stored contents in feet of depth and in thousands of barrels. The internal and external transparent drums are connected to rotate together. Cooperating with the transparent drum a foot scale is mounted affording a depth reading device. Both the foot scale and the thousand-barrel indicia are divided into subdivisions of these measurements by scales connected to the horizontally movable pointer.

The thermal correction in volume or depth is made by advancing or retarding the pointer position readable on the transparent drum and associated scales. The amount of correction varies with every unit of depth change of the liquid volume as well as temperature changes and must be corrected for that particular depth. This is accomplished by a temperature correction graph or scale mounted under the lower pointer end of the movable pointer and by manually directing the pointer to the indicated graph correction.

The invention is illustrated in the accompanying drawings, in which.

As suggested above in discussing the variation of volume under thermal influences, the differences in volumes of stored liquids are reflected by variations in depth. This dimension of depth is also affected by container irregularities. For proper, accurate measurement, the effect of container irregularities must be determined before applying the temperature correction. As depth is the only altered dimension, the tank surfaces restraining other dimensions, the volume is directly indicated by this dimension if properly corrected. Irregularities in the container shape, or displaced volume because of structural or operating members in the space, alter the depth without increasing the volume. These errors are readily corrected in constructing the device described here.

As will be understood after reading the following description of the combination of elements and its operation, the temperature correction utilized in the present invention is an added or subtracted increment dependent on the depth of liquid read. Further, the correct amount is added or subtracted to the depth or volume reading automatically.

Figure 1:
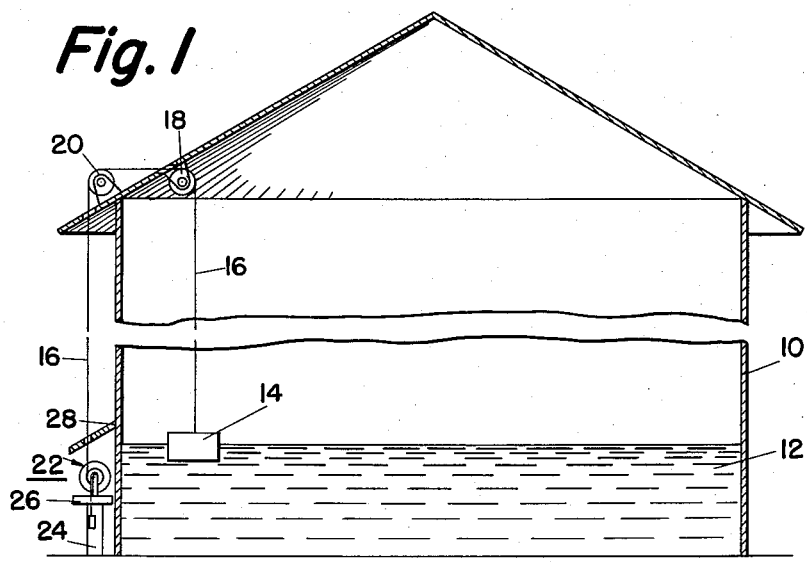
Figure 1 is an elevational view of the device in operating arrangement, in diagram.

Referring now to the drawing, Figure 1 shows a diagrammatical arrangement of the indicating device in operating position. Storage tank 10 supports a volume of liquid 12 in contact with which is float 14. Cable 16, passing over sheaves 18 and 20, is directed to the indicator generally noted by the inclusive number 22. A pedestal 24 and supporting platform 26 position the indicator 22 at reading height above the base of the tank. A hood 28 protects the device from weather, and affords a shelter for the gauger while reading the device.

Figure 2:
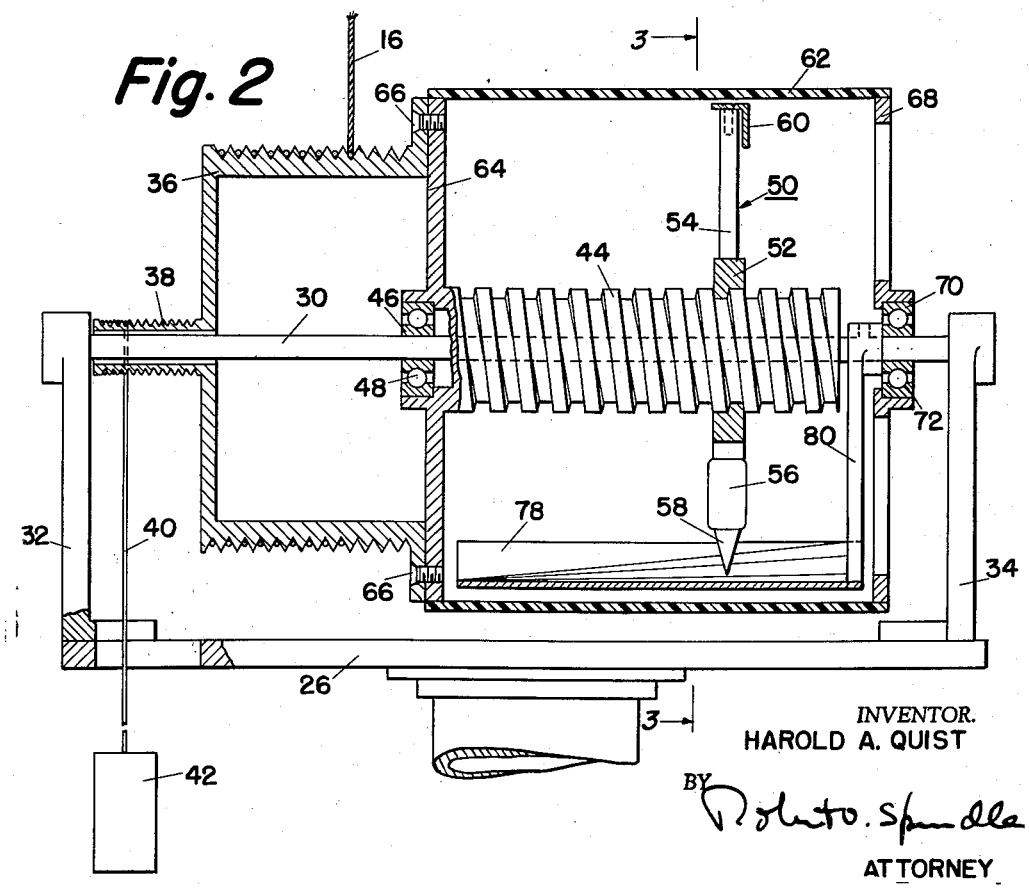
Figure 2 is an enlarged elevational view, partly in section, of the assembled indicator.

In Figure 2 the indicator is enlarged to better show the operating elements and their cooperating relationship. The supporting platform 26 mounts a fixed shaft 30 in spaced brackets 32 and 34. A pulley 36 is spirally grooved to wind cable 16 in reeling action as float 14 responds to the rise and fall of the surface of liquid 12. On the left end of the device as seen in Figure 2, an additional spirally grooved pulley 38 of smaller diameter than pulley 36 winds and unwinds cable 40, lifting and lowering weight 42 to counterweight the liquid supported float.

The movements of the float and counteracting weight operate the indicating elements to which they are attached, shown on the right of Figure 2. Connected to and directly responsive to the rotary motion set up by float 14 and cable 16, spirally grooved drum 44 is concentrically mounted to rotate about fixed shaft 30. A bearing 46 embracing lubricated balls 48 mounts one end of the otherwise unsupported drum 44 for rotation about axis 30. As shown in this figure of the drawing the opposite end of the drum 44 is unsupported.

Figure 4:
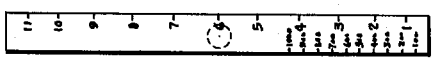
Figure 4 is a plan view of the top of the pointer element showing the scale extended.
Figure 7:
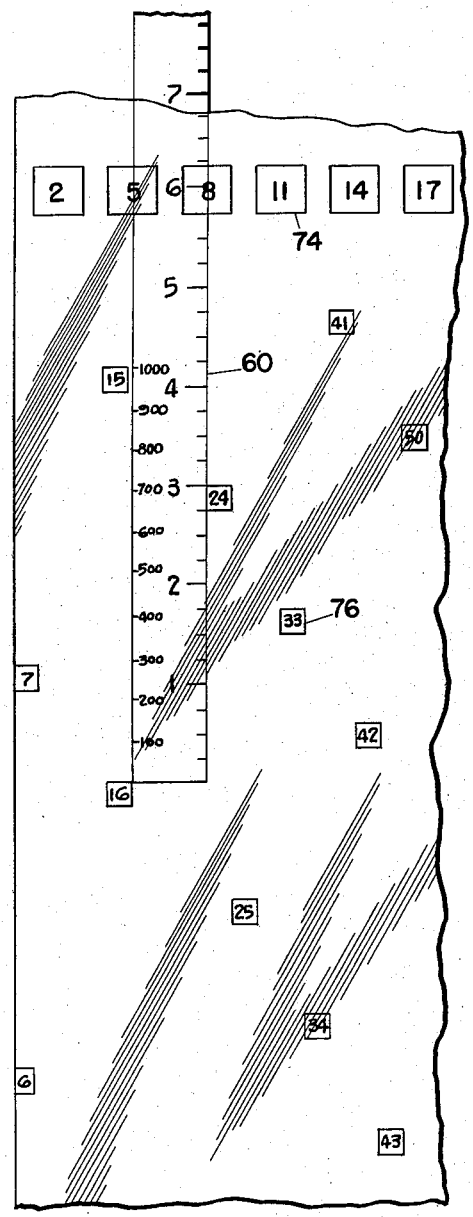
Figures 7 and 8 are illustrations of a reading of the device and the correction for temperature effect.
Figure 8:
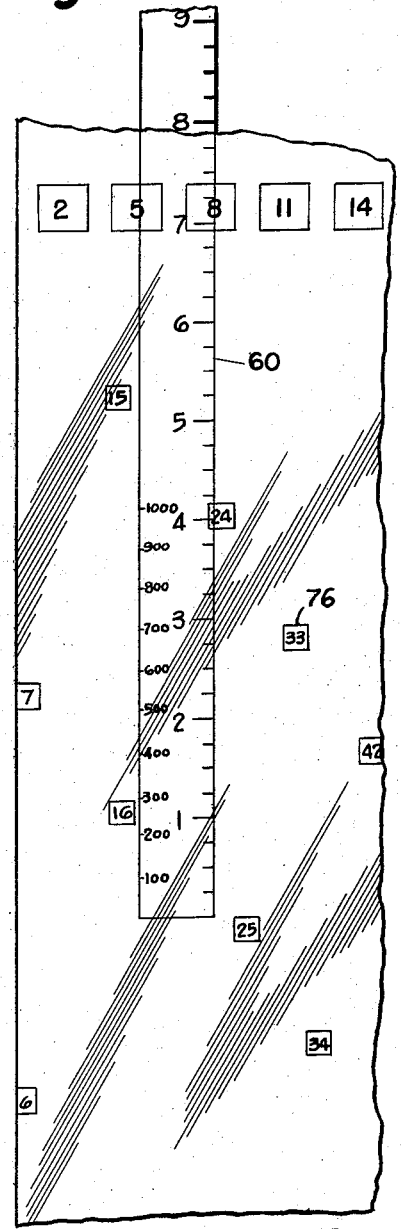

A pointer 50, apertured and grooved at its centrally positioned portion 52, engages the spiral drum 44 and moves longitudinally of the device as the drum rotates. Extending both ends of the pointer 50 toward the top of the apparatus and toward the bottom, a stem 54 engages a weight 56 on the bottom above the pointed end 58. On the upper portion or top, a double indicia scale 60 is mounted. This scale is arcuately disposed for easy interpolation between figures of volume and depth later to be described. In Figures 4, 7 and 8, inches from zero to twelve are indicated on the arcuately shaped scale, together with barrel units from zero to one-thousand, for interpolation between volume marks of one-thousand barrels each.

Figure 3:
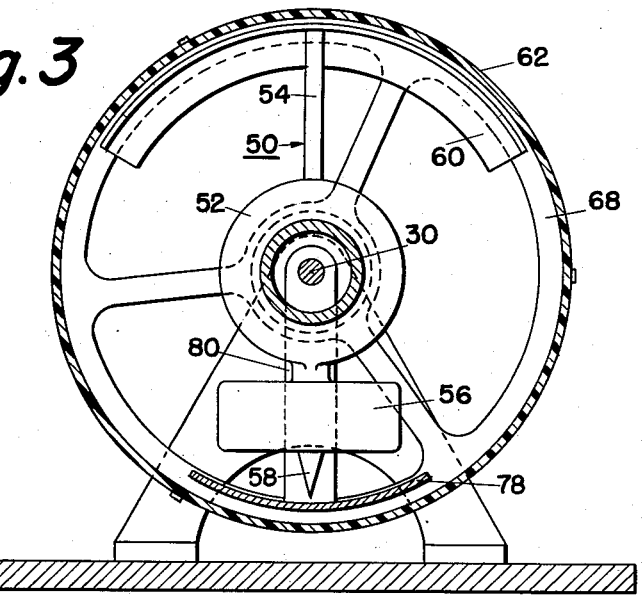
Figure 3 is a sectional view of Figure 2 on lines 3—3.

Depth and volume indicia are carried on a transparent cylinder 62 of Lucite or like substance concentrically arranged about the shaft 30 and spirally grooved drum 44. This transparent cylinder 62 is mounted on end plate 64 which engages the previously described bearing 46. Rotating engagement with the float-cable-operated pulley 36 is assured by connecting this pulley to the end plate 64 as with bolts 66. The end of the cylinder 62 away from end plate 64 is supported by a spider 68 and bearing 70, rotatable on lubricated balls 72. Figure 3 shows the spider 68 with its wide openings necessary for operating the temperature correction elements as described later.

Figure 6:
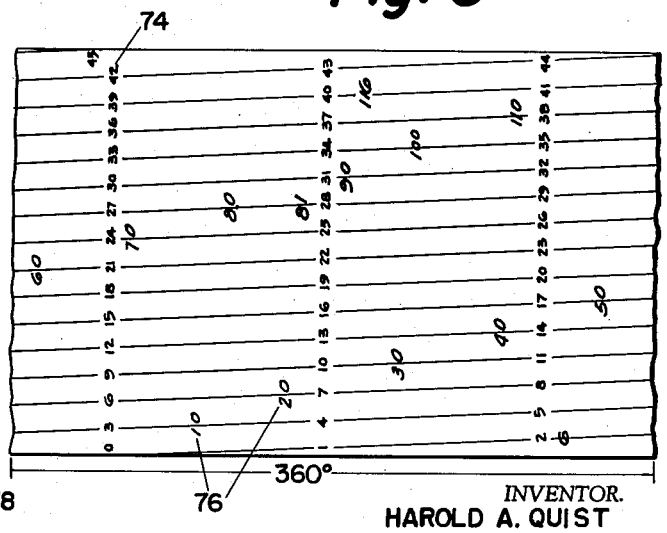
Figure 6 is a view of the transparent cylinder cover in development.

In Figure 6 a development layout of the transparent cylinder 62 is shown by unrolling the covering and spreading it flat. The full 360° coverage is indicated as divided into three equal sections. To those versed in the art the circumference of the indicator transparent cylinder is representative of three feet although it may be larger with indicia 74 placed at the third points, or every one-foot representative mark. It will be understood that sixteen revolutions of this transparent cylinder will cover 48 feet of movement of the float 14, which is a normal stored liquid depth.

At spotted points on the transparent cylinder other indicia 76 are placed to indicate volume in thousands of barrels. As indicated above in explaining the problem giving rise to this invention, these volume indicia are spotted to allow for irregularities in volume arising from tank irregularities in shape, displaced volume due to equipment or construction features and the like. Thus these volume indicia roughly approximate the spiral of the depth indicia and the traverse of the spirally grooved drum 44.

Figure 5:
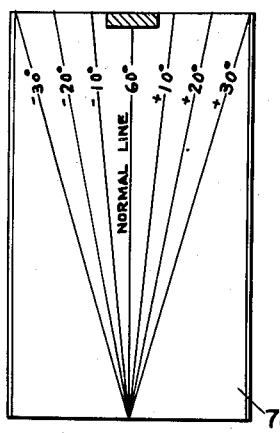
Figure 5 is a plan view of the graph for temperature correction as it is developed.

At the bottom of the transparent cylinder beneath the point 58 of the pointer 50, a graph or scale 78 of the temperature corrections to be applied to depth and volume readings is permanently fixed. Bracket 80, fastened to fixed shaft 30, supports this graph in operating position. Figure 5 is an unrolled view of graph 78 which is shown in Figure 2 to extend the full operating length of the mechanism and to form an arcuately shaped chart under the pointer 50 in Figure 3.

According to the present invention, there is a volume for each depth and temperature which is added to the existing volume or subtracted therefrom, depending on temperature effect, in order to arrive at the correct volume. This is desirable in the petroleum field where liquid petroleum products, often highly volatile, are sold based on an arbitrary temperature accepted as normal.

The present temperature correction tables are customarily made up in increments of one degree Fahrenheit and the temperature in the tank is consequently given within the nearest degree. In a 120,000 barrel tank containing 110,000 barrels of gasoline the possible error in the volume determination could be thirty-three barrels since the temperature is given to the nearest degree and thus could be in error by one-half degree. (Gasoline temperature expansion or contraction coefficient=0.0006.) However, since the spacing of the temperature correction scale on the disclosed device, at this point, is three-eighths of an inch per degree, it means that the correction here could easily be read in one-quarter degree F., that is, the possible error would be about four barrels. If 100,000 bbls. are pumped out leaving 10,000 bbls. in the tank, the spacing on the temperature scale would be a little more than one-thirty-second inch and the absolute reading error would be about the same, that is, four bbls. in the remaining 10,000.

The accepted normal temperature in selling petroleum liquid products is 60° F. Reference to Figure 5 shows the median line on graph 78 to be labeled with the 60° symbol. On the end against which total possible depth of liquid is measured such as 48 feet for example, the added increment for this total volume for each 10° above and below the accepted normal temperature is spaced. The opposite, or zero end, shows the connecting lines converging to a point. Thus for every depth of stored liquid, between zero depth and full capacity, the added or subtracted depth is indicated on graph 78. Movement of the pointer 58 to the proper temperature line of the graph indicates both the corrected depth and volume for the adopted marketing temperature of 60 degrees.

Description of an example in which the above-detailed device is used will make this function clear. Figure 7 shows the relationship of the several scales, as a tank gauger would see them looking through the outer transparent cylinder 62 at the arcuately shaped scale 60. For purposes of this example, it is assumed the average temperature of the body of stored liquid 12 in tank 10 is thirty degrees Fahrenheit or thirty degrees less than the temperature accepted as normal for transfer purposes.

There are 16,000 barrels of liquid in the tank at this reduced temperature as shown by scale 60, zero barrels point of the scale being parallel with the upper edge of indicia 76 reading sixteen. This reading is readily checked by comparing the next lower one-thousand barrel mark of 15 which is substantially opposite the mark of 1000 on scale 60.

Reading from left to right on the foot indicia 74, the left edge of the scale is on the five-foot mark. Level with the top of that mark an added depth of 6 3/16 inches is shown on the inch scale of scale 60. The depth for this volume of 16,000 barrels at 30 degrees below accepted normal temperature is, therefore, 5 feet, 6 3/16 inches.

With this knowledge the gauger reaches inside the transparent cylinder 62 through an opening in spider 68 and moves pointer 50 to an adjusting position by adjusting the pointed end 58 to coincide with the −30 degree lines as indicated in Figure 5. Scale 60 is moved to a new position as shown in Figure 8. Reading the upper edge of indicia 76 shows a new and corrected volume of 16,290 barrels to be the adjusted volume while the new depth is now 5 feet, 7 3/8 inches. This is the volume and depth the liquid would assume if the temperature were at 60 degrees, the accepted normal reading.

It will be understood that this is one of many examples possible to illustrate the operation of this improved device. It is selected because it combines several qualities of the invention; another example might not. It seems obvious that the correction may be made in a reverse way, were the average temperature of the stored liquid higher than the accepted normal temperature. Further, the lower and upper temperature brackets of thirty degrees indicate a selection of temperature variations for a temperate climate. Any desired change can readily be made. Also, it appears clear that should the average temperature be 60°, or the normal, no correction should be made.

In view of the above, it will be clear that the several objects of the invention are achieved and other advantageous results obtained.

I claim:

1. Apparatus for gauging the quantity of liquid in a storage tank comprising in combination a float, a support externally of the tank positioned at convenient reading height, a bracket on said support positioning a horizontally disposed fixed axis, a rotatable transparent cylinder concentrically disposed about said axis, a spirally grooved drum concentrically disposed within the transparent cylinder and rotatable therewith, a gauge pointer adapted to engage the spirally grooved drum for longitudinal movement thereon, said pointer being provided with means for preventing the same from rotating with said drum; a flexible cable extending from the float to the rotatable cylinder and drum, means connecting the cable with the cylinder and drum, means to counter-rotate said cylinder and drum to keep the float connecting cable taut, and a fixed arcuate temperature correction scale positioned within said cylinder for cooperation with the movable gauge pointer and of a length in the longitudinal direction commensurate with the maximum amount of movement of said pointer, said pointer being manually movable in an arcuate direction with respect to said scale for indicating the correction to be made for variation in liquid volume effected by temperatures.

2. Apparatus for determining the quantity of liquid in a tank comprising in combination a rotatable transparent cylinder with indicia of volume and depth arranged thereon, a helically grooved drum disposed within said cylinder and arranged to rotate with said cylinder, float-controlled means operably connected to rotate the cylinder and drum in response to liquid level changes in the tank, an elongated gauge pointer operatively engaging the grooves in said drum, means to maintain said pointer oriented in a generally constant direction as said cylinder and drum rotate, whereby said pointer will move longitudinally of said drum and cylinder as the same rotate, and a fixed temperature correction scale positioned within said cylinder for cooperation with the movable gauge pointer, said scale having a length commensurate with the maximum amount of movement of said pointer.

3. The apparatus described in claim 2, wherein the last-mentioned means comprises a weight on one end of said pointer maintaining the same oriented in a vertical direction and in normal position relative to the temperature correction scale, said apparatus also including an arcuate vernier scale mounted on said pointer at the other end thereof and having indicia thereon spaced to divide both the depth and volume indications on said cylinder into subdivisions of those measurements.

References Cited in the file of this patent

UNITED STATES PATENTS

| | | |
|---|---|---|
| 1,879,805 | Jones | Sept. 27, 1932 |
| 1,933,522 | Edwards | Oct. 31, 1933 |
| 2,151,579 | Bacon | Mar. 21, 1939 |